Figures 1, 2, 3, 4:
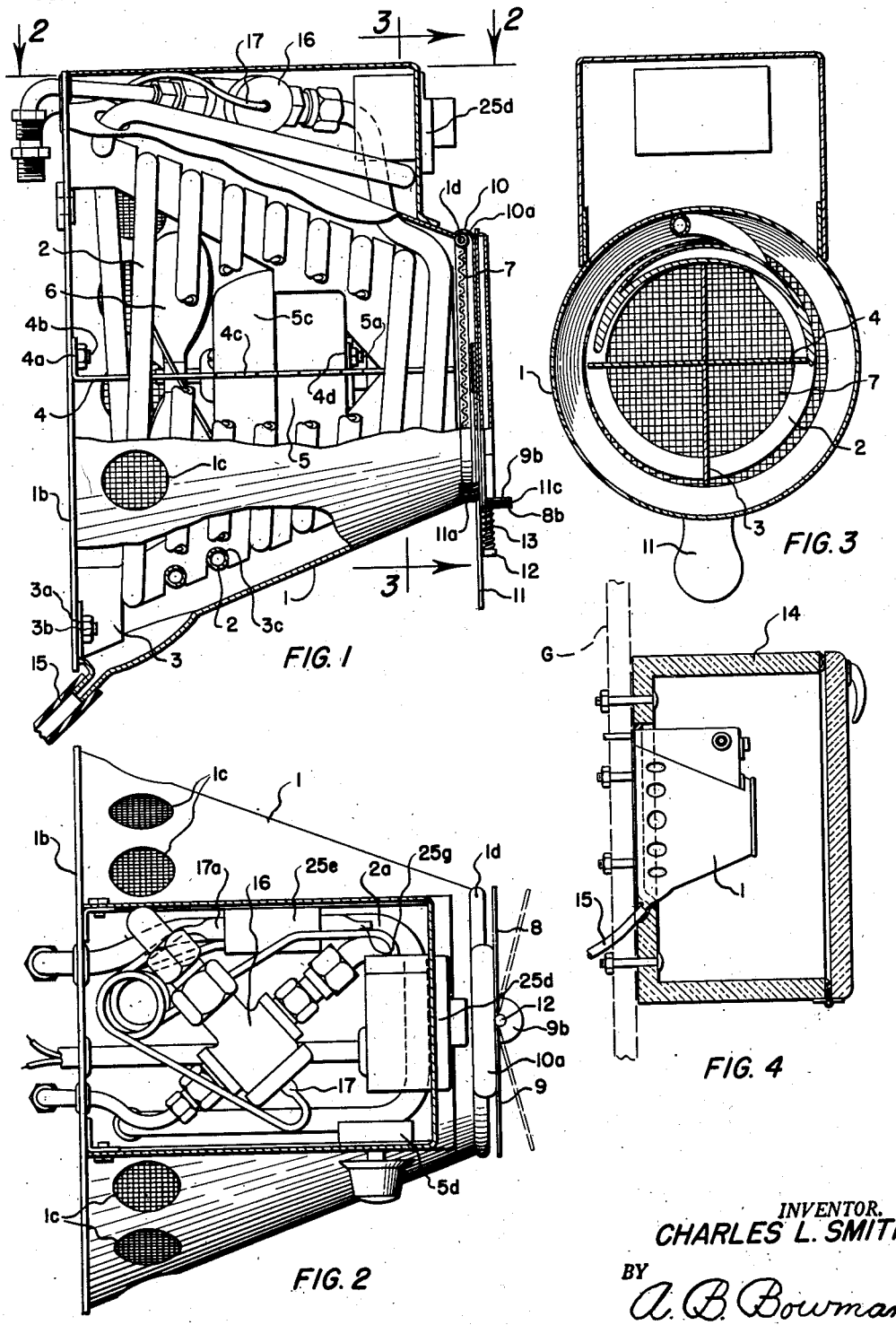

Jan. 24, 1950 — C. L. SMITH — 2,495,351
AIR CONDITIONING APPARATUS
Filed Nov. 25, 1946 — 2 Sheets-Sheet 1

INVENTOR.
CHARLES L. SMITH
BY A. B. Bowman
ATTORNEY

Jan. 24, 1950
C. L. SMITH
2,495,351
AIR CONDITIONING APPARATUS
Filed Nov. 25, 1946
2 Sheets-Sheet 2
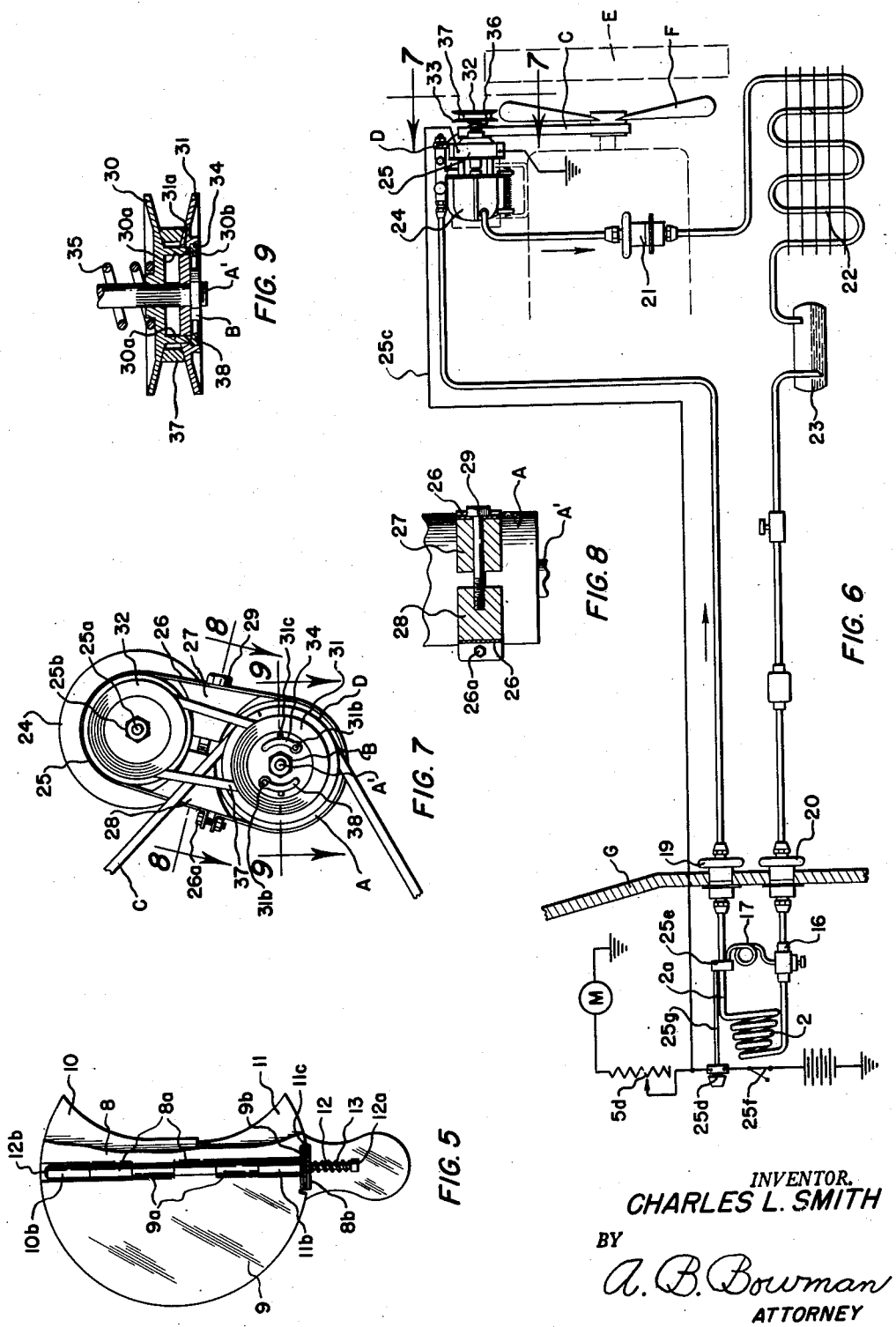
INVENTOR.
CHARLES L. SMITH
BY
A. B. Bowman
ATTORNEY Patented Jan. 24, 1950

2,495,351

UNITED STATES PATENT OFFICE 2,495,351

AIR CONDITIONING APPARATUS

Charles L. Smith, San Diego, Calif.

Application November 25, 1946, Serial No. 712,183

6 Claims. (Cl. 62—4)

My invention relates to an airconditioning apparatus, more particularly for use in connection with vehicles and the objects of my invention are:

First, to provide an airconditioning apparatus of this class in which refrigerated air is introduced into the operator's compartment of a vehicle.

Second, to provide an airconditioning apparatus of this class in which the evaporator coil is substantially frusto-conically shaped in surrounding relationship with a fan, whereby draft created by said fan efficiently exchanges heat throughout the entire length of said coil providing a very efficient refrigerant evaporator.

Third, to provide an airconditioning apparatus of this class which may be readily converted into a cabinet refrigerator.

Fourth, to provide an airconditioning apparatus of this class which may be used either for cooling the interior of the operator's compartment of the vehicle or for refrigerating foods and beverages therein as desired.

Fifth, to provide an airconditioning apparatus of this class which is readily installed in connection with the operating mechanism of a vehicle by means of detachable refrigerant tube couplings which automatically seal both ends of the tube being disconnected when removing the same and automatically connect said tubing in communicative relationship when said couplings are replaced.

Sixth, to provide an airconditioning apparatus of this class incorporating novel refrigerant compressor operating mechanism.

Seventh, to provide an airconditioning apparatus of this class incorporating compressor mounting means adaptable to various models of vehicle engines.

Eighth, to provide an apparatus of this class in which the driving mechanism in connection with the compressor thereof, automatically changes the driving ratio thereof when the speed of the vehicle engine changes.

Ninth, to provide an airconditioning apparatus of this class which is very simple and economical in construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon forming a part of this application, in which:

Fig. 1 is a side elevational view of the evaporator unit of my airconditioning apparatus showing portions broken away and in section to amplify the illustration; Fig. 2 is a plan sectional view taken from the line 2—2 of Fig. 1; Fig. 3 is a sectional view taken from the line 3—3 of Fig. 1; Fig. 4 is a reduced side elevational view of the evaporator unit of my airconditioning apparatus showing a refrigerator cabinet placed in connection therewith illustrated in section; Fig. 5 is a fragmentary view of the shutter mechanism used in connection with the evaporator unit of my airconditioning apparatus; Fig. 6 is a diagrammatic view of the refrigerating mechanism of my airconditioning apparatus showing the connected relationship thereof with a conventional vehicle engine; Fig. 7 is an enlarged elevational view of the compressor of my airconditioning apparatus shown connected with the vehicle engine generator; Fig. 8 is a fragmentary sectional view taken from the line 8—8 of Fig. 7; and Fig. 9 is an enlarged fragmentary sectional view taken from the line 9—9 of Fig. 7.

Similar characters of reference refer to similar parts and portions throughout the several views of the drawings.

The casing 1, evaporator coil 2, coil frame plates 3 and 4, motor 5, fan 6, screen 7, shutters 8 and 9, shutter clips 10 and 11, hinge pin 12, spring 13, cabinet 14, drain tube 15, expansion valve 16, "Sylphon" 17, couplings 19, 20 and 21, condenser 22, receiver 23, compressor 24, magnetic coupling 25, band 26, adapters 27 and 28, bolts 29, sheave plates 30, 31, 32 and 33, centrifugal actuator 34, springs 35 and 36, and the belt 37 constitute the principal parts and portions of my airconditioning apparatus.

The casing 1, as shown in Fig. 1 of the drawings, is substantially frusto-conical in form and is preferably made of relatively thin material such as sheet metal or the like. This casing 1 at its large diameter end is secured to a base plate 1b and the coil frame plates 3 and 4 are arranged in perpendicular radially disposed relation to each other, also in connected relation with the base plate 1b. These coil frame plates 3 and 4 are provided with angularly disposed feet portions 3a and 4a respectively secured by the bolts 3b and 4b to said base plate 1b all as shown best in Fig. 1 of drawings. The casing 1 is provided with inlet openings 1c in the sidewall thereof in spaced relation with the base plate 1b for admitting air into the casing 1 about the periphery of the fan 6 a short distance rearwardly thereof all as shown best in Fig. 1 of the drawings. The coil 2 is a hollow tubular member arranged in coiled form substantially frusto-conical in shape supported on the coil frame plates 3 and 4 inwardly of the casing 1. It will be noted that the coil frame plates 3 and 4 are provided with notch portions 3c and 4c respectively in which convolutions of the evaporator coil 2 are positioned. These coil frame plates 3 and 4 also support the motor 5 concentrically of the evaporator coil by means of angularly disposed clip portions 4d of the frame plate 4 in connection with the motor bolts 5a all as shown best in Fig. 1 of the drawings. The small diameter end of the casing 1 is provided with a screen 7, arranged to provide an outlet air filter of the air draft created by the fan 6 operated by the motor 5. It will be noted that the casing 1 is provided with an annular bead 1d surrounding the small diameter outlet end portion thereof to the inner side of which the screen 7 is secured. Engaging the outer of this annular bead 1d are the shutter clips 10 and 11. These shutter clips 10 and 11 are arcuate members telescopically connected together and provided with engaging portions 10a and 11a respectively arranged to fit over said bead 1d in opposed relation to each other as shown best in Fig. 1 of the drawings. Secured to the shutter clip 10 is a bearing 10b and secured to the shutter clip 11 is a bearing 11b. The hinge pin 12 extends through the bearings 10b and 11b and is provided with head portions 12a and 12b at its opposite ends. Intermediate the bearing portions 10b and 11b of the shutter clips 10 and 11 are hinge portions 9a and 8a of the shutters 8 and 9, through which the hinge pin 12 also extends. The spring 13 is interposed between the head portion 12a and the friction plate 8b, as shown in Fig. 5 of the drawings and is positioned around the hinge pin 12 tending to force the bearing portions 10a and 11a together in engagement with the annular bead 1d of the casing 1. It will be here noted that the hinge portions 8a and 9a of the shutters 8 and 9 are pivotally moveable about the axis of the hinge pin 12 as indicated by dash lines in Fig. 2 of the drawings. As shown in Fig. 1 and 2 of the drawings, the inlet end of the evaporator coil 2 is connected with the expansion valve 16 having a "Sylphon" 17 provided with a bulb 17a secured in connection with the frostloop portion 2a near the opposite end of the evaporator coil. It will be noted that the inlet end of evaporator coil 2 is the small diameter end of the coil while the frostloop portion 2a is connected with the large diameter end of the coil 2. Connected to the inlet end of the coil 2 adjacent the expansion valve 16 is the coupling 20. This coupling 20 is a quickly removable coupling arranged to disconnect the tube intercommunicating with the evaporator coil and the receiver 23. It will be here noted that these couplings 19, 20 and 21 are conventional couplings supplied by the Aeroquip Corporation, Jackson, Michigan, U. S. A. and are disclosed in Bulletin No. 107A published by said Aeroquip Corporation. Connected with the opposite end of the coil 2 near the frostloop portion 2a thereon is the coupling 19 which is similar in construction to the coupling 20 and the coupling 21. These couplings 19, 20 and 21 are conventional detachable couplings which effectively close the tubes connected thereby when removed whereby leakage is prevented, also air is prevented from being introduced into the tubes connected by the couplings 19, 20 and 21. The compressor 24 as shown in Figs. 6 and 7 is mounted on the conventional automobile generator A by means of the strap 26 which passes around said generator A and the magnetic coupling 25 in connection with said compressor 24. The adapters 27 and 28 are interposed between the conventional generator A and the housing of the magnetic coupling 25. The adapters 27 and 28 are adjustable relatively to each other laterally of the axis of the generator and magnetic coupling 25 for adjustment of the belt 37 relatively to the sheave plates 30, 31, 32 and 33. It will be noted that the bolt 29 passes through the band 26 and the adapter 27 and is screw-threaded into the adapter 28, whereby said adapter 28 may be forced toward the adapter 27 for extending the spaced relation of the axis of said generator A and the magnetic coupling 25 respectively. Connected with the shaft 25a of the magnetic coupling 25 are the sheave plates 32 and 33 which are moveable relatively to each other in connection with the shaft 25a. The spring 36 as shown in Fig. 6 of the drawings tends to force the sheave plate 33 toward the sheave plate 32, restrained by the nut 25b on the shaft 25a. These sheave plates 32 and 33 are provided with inwardly beveled portions arranged to receive a conventional V-belt 37 as shown best in Figs. 6 and 7 of the drawings. The belt 37 is shown in Figs. 7 and 9 of the drawings, also passes over the sheave plates 30 and 31 mounted on the shaft A' of the generator A and these sheave plates 30 and 31 are also adjustable relatively to each other longitudinally of the shaft A'. The spring 35 as shown best in Fig. 9 of the drawings tends to force the sheave plate 30 towards the sheave plate 31 which is restrained by the nut B on the shaft A'. In connection with the sheave plate 30 is an extending cam portion 30a which extends through an opening 31a in the sheave plate 31 outwardly of the axis of the shaft A' on which the sheave plates 30 and 31 are mounted. Pivoted in connection with the sheave plate 31 on the pin 31b, in connection therewith, is the centrifugal actuator 34. This centrifugal actuator 34 is adapted to engage a stop 31c in connection with the sheave plate 31 and is arranged to engage the inclined surface 30b of the extension in connection with the sheave plate 30 in the opening 31a of the sheave plate 31. The conventional automobile fan belt C as shown in Fig. 6 of the drawings derives the conventional generator pulley D secured on the shaft A' inwardly of the spring 35. A condenser 22 is a conventional refrigerant condenser communicating with the outlet of the compressor 24 and inter-connected therewith by means of the removable coupling 21 similar to the couplings 19 and 20 hereinbefore described. A receiver 23 is a conventional refrigerant receiver in communicative relation with the condenser 22. It will be here noted that this condenser 22 as shown diagrammatically is placed outside the air stream common to the radiator E and fan F of the vehicle engine. The electrical equipment shown in the diagrammatic view of Fig. 6 includes an electrical conductor 25c electrically connected with the magnetic coupling 25 and the thermostatic switch 25d having a "Sylphon" sampling bulb 25g supported by the clip 25e in connection with the frostloop 2a of the evaporator coil 2. This thermostatic switch 25d is electrically energized through the common ignition switch 25f of the motor vehicle. The electric motor 5 inwardly of the evaporator coil 2 is electrically connected with the output side of the thermostatic switch 25d and is provided with a rheostatic control 5d for regulating the operating speed of the fan 6 in connection with the motor 5.

The operation of my airconditioning apparatus is substantially as follows:

When my airconditioning apparatus is operating as a refrigerator for the interior of the operator's compartment of a vehicle, the refrigerating unit as shown in Figs. 1 and 2 of the drawings is placed in the operator's compartment and the couplings 19 and 20 are located forward of the dash G of the vehicle shown best in Fig. 6 of the drawings. The compressor 24 is operated in connection with the magnetic clutch 25 driven by the sheave plates 30, 31, 32 and 33 together with the belt 37 as hereinbefore described. As the compressor 24 operates it supplies the condenser 22 with fluid under pressure which causes condensation thereof which is stored in the receiver 23. From the receiver 23 the condensate passes through the coupling 20 and expansion valve 16 into the small diameter end of the frusto-conical evaporator coil 2 in which the liquid is evaporated and which passes outwardly thereof through the frostloop 2a and back to the compressor 24. The capacity of the refrigerating mechanism as shown in Fig. 6 of the drawings is insufficient to reduce the temperature of the frostloop to a degree which would cause the thermostatic switch 25d to de-energize the magnetic coupling 25 when the evaporator unit as shown in Fig. 1 of the drawings is used as a refrigerator for cooling the operator's compartment of a vehicle. In such use the fan 6 in connection with the motor 5 constantly aerates the evaporator coil 2 maintaining the temperature therein slightly above the "Sylphon" actuating temperature which would cause the magnetic clutch 25 to be de-energized by means of the "Sylphon" 25e in connection with the thermostatic switch 25d. However, when the cabinet 14, as shown in Fig. 4 of the drawings, is in place about the casing 1, temperature within the cabinet 14 intermittently reaches a low degree which causes operation of the thermostatic switch 25d in connection with the "Sylphon" 25e on the frostloop 2a of the evaporator coil 2. When this thermostatic switch 25d is operated it de-energizes the magnetic clutch 25 which causes the operation of the compressor 24 to stop, thus, the temperature in the cabinet 14 raises until it reaches a certain degree and then the heat automatically shuts off by the discontinued operation of the compressor 24. Thus, it will be noted that the motor 5 ceases to operate the fan 6 when the temperature reaches a certain low degree sufficient to operate the "Sylphon" 25e for opening thermostatic switch 25d. During operation of the motor 5 the speed thereof may be regulated by means of the rheostat 5d. After the vehicle in which my airconditioning apparatus has stopped for a certain length of time, the frost in connection with evaporator coil melts and the liquid therefrom drains outwardly of the casing 1 through the drain tube 15 which passes through the dash G as shown best in Fig. 4 of the drawings. As shown in Fig. 9 of the drawings, the sheave plate 30 in opposed relation to sheave plate 31 is provided with protrusions 30a extending through openings 31a in the sheave plate 31. The end portion of this protrusion 30a is beveled on a plane facing the axle A' and this beveled surface is engageable with the centrifugal actuator 34 which is pivoted on the pin 31b in connection to the sheave plate 31. During rotation of the sheave plates 30, 31, 32 and 33, centrifugal force tends to pivot the centrifugal actuator 34 outwardly toward the protrusion 30a at its inclined end portion 30b which is engaged by the centrifugal actuator 34 forcing the protrusion 30a axially of the shaft A', separating the sheave plate 30 from the sheave plate 31, whereupon the belt 37 assumes a smaller diameter track between the sheave plates 30 and 31 permitting the spring 36 to force the sheave plates 32 and 33 together causing the belt 37 to travel on a larger diameter track intermediate the sheave plates 32 and 33. Thus, high speed operation of the vehicle engine automatically changes the speed ratio of the shafts A' and 25a so that the compressor 24 is not driven at excessive speed. When the vehicle engine is operating at a slow or idling speed, the spring 35 in opposed related to the centrifugal actuator 34 acting on the beveled surface of the protrusion 30a forces the sheave plate 30 toward the sheave plate 31 enlarging the track diameter of the belt 37 intermediate the sheave plates 30 and 31 whereby proportionate reduction in the track diameter of the belt 37 about the sheave plates 32 and 33 is accomplished, thus increased speed ratio of the compressor 24 is accomplished by changing the speed ratio between the shafts A' and 25a. In operation, the speed at which the compressor 24 is driven remains substantially constant due to the automatic speed ratio change between shaft A' and shaft 25a accomplished by the centrifugal actuator 34 bearing on the beveled end 30b of the protrusion 30a extending through the opening 31a in the sheave plate 31. When it is desirable to adjust the disposition of the sheave plates 30 and 31 relatively to the sheave plates 32 and 33, the adapters 27 and 28 may be shifted together or away from each other by adjustment of the bolt 29, whereupon the bolt 26a in connection with the band 26 is set up accordingly so that the compressor 24 together with the magnetic coupling 25 is maintained in certain position in connection with the generator A. It will be noted that axis of the shaft 25a may be rotated about the axis of the shaft A' on the generator A to accommodate various features of various engines. It will be here noted that the motor 5 is provided with an air stream deflector 5c which deflects air driven by the fan outwardly toward the coil 2 evenly distributing said air over the entire frusto-conical outline of said coil 2.

It will be here noted that the centrifugal actuator 34 only has been described herein, however, the centrifugal actuator 38 is arranged in opposed relation to the centrifugal actuator 34 over the axis of the shaft A and is substantially of the same construction and operation as the centrifugal actuator 34.

In operation of the shutters 8 and 9 the friction plates 8b and 9b bear on opposite sides of the plate 11c integral with the shutter clip 11. The spring 13 maintains the plates 8b and 9b in frictional engagement with the plate 11c for holding the shutters 8 and 9 in the desired adjusted position.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new, and desire to secure by Letters Patent is:

1. In an airconditioning apparatus of the class described the combination of the hollow tubular coil arranged in convolutions substantially frusto-conical in arrangement and a fan internally of said convolutions, said fan arranged to force air in a direction from the large diameter convolutions toward the small diameter convolutions, a frusto-conical casing surrounding said coil, a drain tube in communicative relation with the lowermost portion of said casing.

2. In an airconditioning apparatus of the class described the combination of the hollow tubular coil arranged in convolutions substantially frusto-conical in arrangement and a fan internally of said convolutions, said fan arranged to force air in a direction from the large diameter convolutions toward the small diameter convolutions, a frusto-conical casing surrounding said coil, a drain tube in communicative relation with the lowermost portion of said casing, shutter means adjustably secured in connection with the reduced diameter outlet end of said casing.

3. In an airconditioning apparatus of the class described a combination of an evaporator coil, a compressor, a condenser communicating with said compressor, a receiver communicating with said condenser, a readily detachable coupling in communicative relation with said receiver and said evaporator coil inter-connecting said receiver and said evaporator coil, and a readily detachable coupling communicating with the opposite end of said evaporator coil and said compressor and inter-connecting said evaporator coil and said compressor, a readily detachable coupling inter-connecting said compressor and said condenser.

4. In an airconditioning apparatus of the class described a combination with the generator of a vehicle engine of a refrigerant compressor, spaced adapters intermediate said generator and said compressor, and a tension strap surrounding said compressor and said generator for maintaining said compressor in connection with said generator.

5. In an airconditioning apparatus of the class described a combination with a generator of a vehicle engine of a refrigerant compressor, spaced adapters intermediate said generator and said compressor, and a tension strap surrounding said compressor and said generator for maintaining said compressor in connection with said generator, an adjustment bolt arranged in screw-threaded relation with one of said adapters arranged to force said adapters together for adjusting the spaced relation of said compressor relatively to said generator.

6. In an airconditioning apparatus of the class described the combination of the hollow tubular coil arranged in convolutions substantially frusto-conical in arrangement, a fan internally of said convolutions, a motor for said fan and an outwardly directed annular deflector at one end of said motor adjacent said fan for directing air toward said coil.

CHARLES L. SMITH.

REFERENCES CITED

The following references are of record in the file of this patent:

UNITED STATES PATENTS

| Number | Name | Date |
| --- | --- | --- |
| 1,890,888 | Sherman | Dec. 13, 1932 |
| 2,033,983 | Greenwald | Mar. 17, 1936 |
| 2,056,353 | Haunz | Oct. 6, 1936 |
| 2,173,661 | Perrine | Sept. 19, 1939 |
| 2,317,339 | Stevens | Apr. 20, 1943 |
| 2,338,953 | Melke | Jan. 11, 1944 |
| 2,356,772 | Magee | Aug. 29, 1944 |